Nov. 30, 1926.

W. H. HANNAH 1,608,558

POWER OPERATED SAW

Filed March 27, 1925    2 Sheets-Sheet 1

Fig. 1ᴬ.

Inventor
WALTER H. HANNAH,

By

Attorney

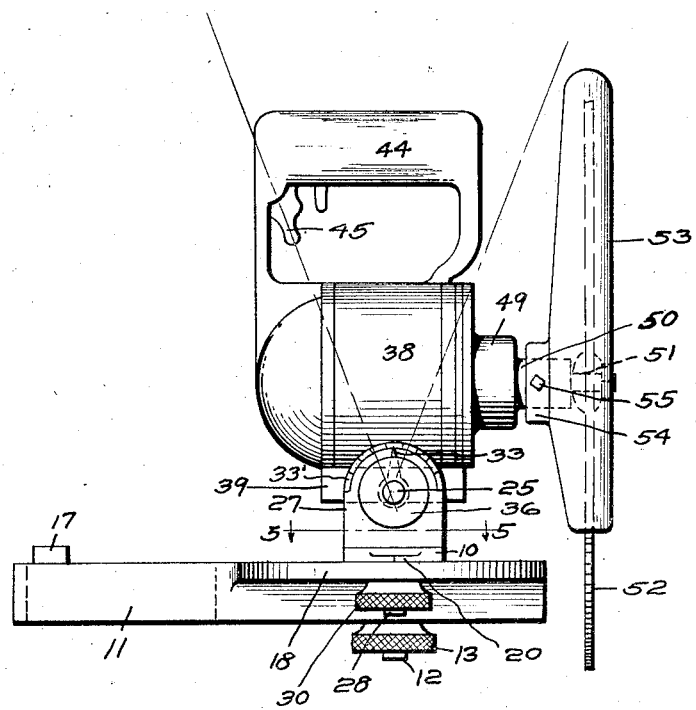
Fig. 3.
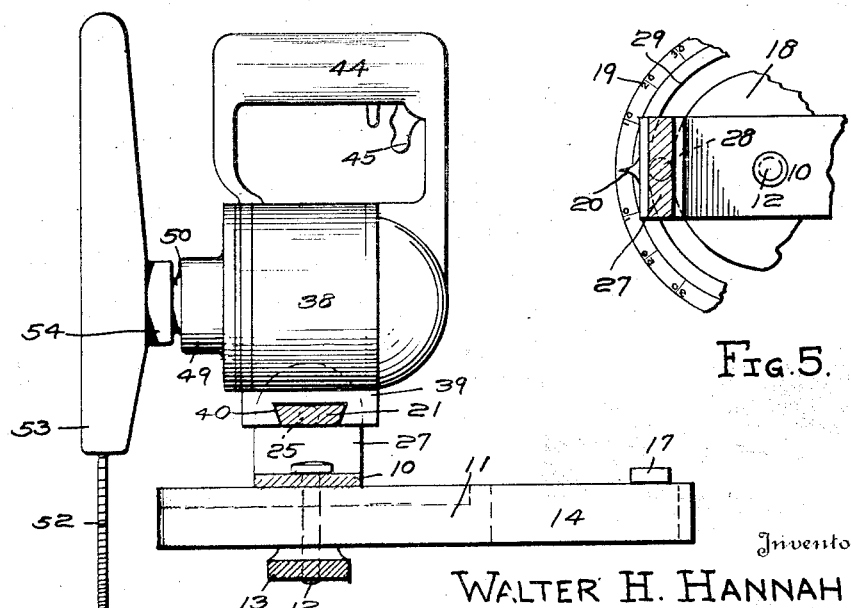
Fig. 5.
Fig. 4.
Inventor
WALTER H. HANNAH,

Patented Nov. 30, 1926.

1,608,558

UNITED STATES PATENT OFFICE.

WALTER H. HANNAH, OF PORTSMOUTH, OHIO.

POWER-OPERATED SAW.

Application filed March 27, 1925. Serial No. 18,761.

My invention relates to power driven saws.

An important object of the invention is to provide a power driven saw, which is portable, so that it may be readily applied to the work, by a single operator, and dispensing with the necessity of bringing the work to the saw, as is the case with the usual saw table.

A further object of the invention is to provide a power driven saw having means whereby the cutting element may be adjusted at various angles, for cutting rafters or the like, with simple or compound angular cuts.

A further object of the invention is to provide a power driven saw of the above mentioned character which is of simple construction, cheap to manufacture, strong, and durable.

Other objects and advantages of the invention will be apparent during the course of the following description.

Figure 1:
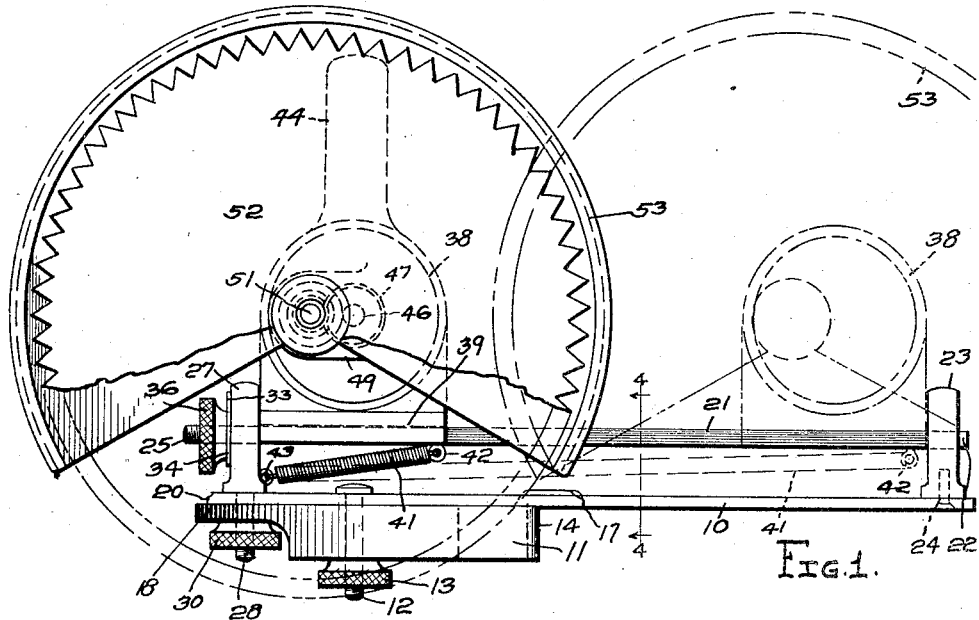
Figure 2:
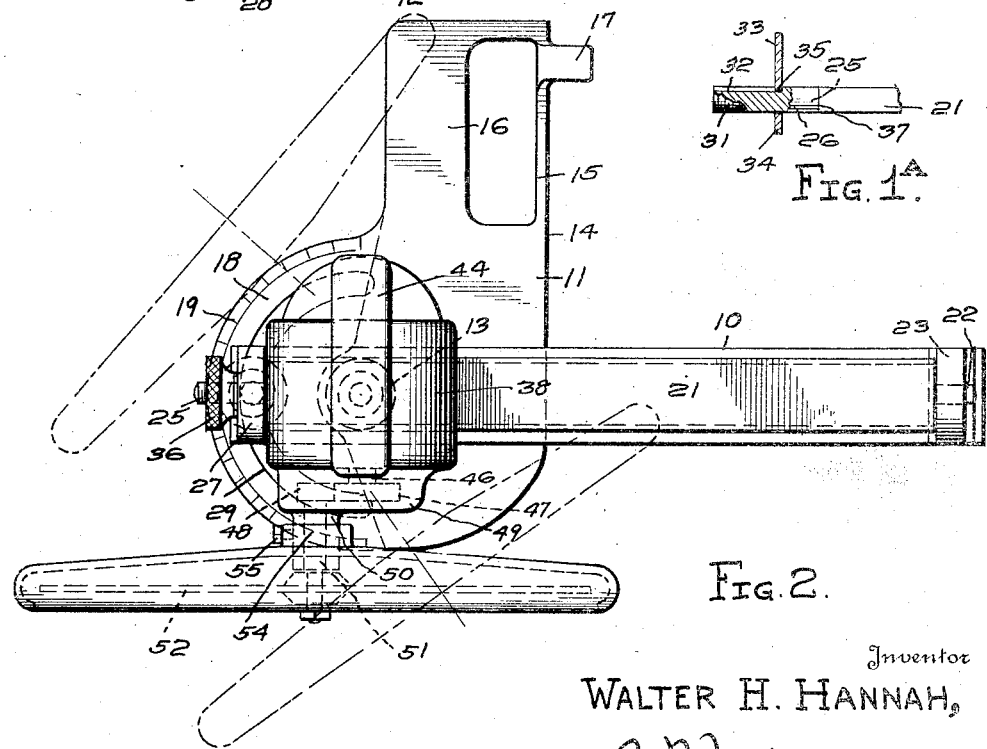

In the accompanying drawings, forming a part of this specification, and in which like numerals are employed to designate like parts through the same, Figure 1 is a side elevation of a power driven saw embodying my invention, Figure 1ᵃ is a detail section through a pointer and associated elements, Figure 2 is a plan view of the same, Figure 3 is an end elevation of the same, Figure 4 is a transverse section taken on line 4—4 of Figure 1, Figure 5 is a detail section taken on line 5—5 of Figure 3.

In the drawings, wherein for the purpose of illustration is shown a preferred embodiment of my invention, the base or body portion of the device is in the form of a square or T-square, embodying a blade or base element 10, arranged upon, and pivotally connected with a head 11, by means of a bolt 12, carrying a nut 13, which is preferably milled. It is thus seen that the blade may be angularly adjusted with respect to the inner straight edge 14 of the head 11, and clamped thereto at a selected angular position. This head is provided with a hand hold 15, affording a hand grip 16, for the convenient manipulation of the machine. A lip 17 is preferably formed integral with the head 11, adjacent to the opening 15, and is adapted to engage over the top of the plank or the like to be cut.

The head 11 is provided upon its rear edge with a segmental extension 18, which is preferably thinner than the head, and this segmental extension is provided at its edge with a suitable scale 19, for co-action with a pointer 20, carried by the rear end of the blade 10. This scale and pointer serve to indicate the angular position of the blade with respect to the edge 14, of the head 11.

Extending longitudinally above the blade or base element 10, in spaced relation thereto, is a track or guide 21, which is preferably inverted trapezoidal in cross section, as more clearly shown in Figure 4. At its forward end, the track or guide 21 is provided with a trunnion 22, preferably integral therewith, which is rotatably mounted within a bearing-standard 23, which is rigidly mounted upon the upper surface of the blade 10, near its forward end, and secured thereto by means of a screw or screws 24, or any other suitable means. The opposite or rear end of the track 21 is provided with a trunnion 25, preferably integral therewith, and having an inner smooth portion 26, which is rotatably mounted within an opening formed in a bearing-standard 27. The lower end or base of this bearing-standard is mounted upon the upper face of the segmental extension 18, and may be slid thereon. Depending from the bearing-standard 27 is a bolt 28, rigidly secured thereto, and this bolt slides within a segmental groove 29, formed in the blade 18. This bolt carries a clamping nut 30, which is preferably milled. This bolt 28 and clamping nut 30 and the extension or blade 18 also serve to lock the blade 10 to the head 11, in the selected angular position, with relation thereto. The trunnion 25 extends rearwardly beyond the bearing-standard 27 and this trunnion has an outer screw-threaded portion 31, which is provided with a longitudinal groove 32. The numeral 33 designates a pointer, having a body portion 34, which is provided with an opening for the reception of the trunnion 25, and also carries an inwardly extending tongue 35, which is adapted to enter the groove 32. This pointer is therefore splined upon the trunnion to turn therewith and move longitudinally thereof. This pointer 33, Figure 3, is adapted for co-action with a segmental scale 33′, formed upon the bearing-standard 27, thereby indicating the angular position of the track 21, when turning upon its longitudinal axis.

A clamping nut 36 engages the screw-threaded end 31 of the trunnion and is adapted to lock the track 21 against the bearing-standard 27, the shoulder 37 of the track 21 being drawn into clamping engagement with the bearing-standard 27, as is obvious. From the foregoing description, it is thus seen that the track 21 may be turned upon its longitudinal axis with respect to the bearing-standards 23 and 27, and by proper manipulation of the nut 36, said track may then be locked in the selected angular position, as stated.

I provide an electric motor of any well known or preferred type, the same embodying a casing 38. This casing is mounted to slide longitudinally upon the track or guide 21, and for this purpose the casing may be provided at its bottom with a base 39, having a groove 40, which is inverted trapezoidal in cross section, to receive the track 21. The invention is not necessarily restricted to this precise form of slidable engagement between the motor casing and the track, as other means may be employed with some degree of success. A retractile coil spring 41 is attached at one end to the base 39, as indicated at 42, and at its opposite end to the bearing-standard 27, as shown at 43. The function of this spring is to provide means whereby the saw or cutting element will not tend to feed forwardly, due to the vibrations of the machine in operation, should the operator remove his hand from the motor casing. The motor casing 38 is provided with an inverted U-shaped handle 44, rigidly secured thereto. This handle 44 is preferably vertically arranged, and projects above the motor casing, and is also preferably parallel with the armature shaft of the motor. The handle 44 is equipped with a trigger 45, which is adapted to control the current to the motor, and hence the operation of the motor. As more clearly shown in Figure 2, the numeral 46 designates the armature shaft of the motor, driving a gear 47, engaging a smaller gear 48. These gears are enclosed within a gear casing 49, carried by the motor casing. The gear casing 49 carries a sleeve 50, in which is journaled a shaft or spindle 51, upon which the gear 48 is rigidly mounted. This shaft or spindle carries the saw or rotatable cutting element 52. Surrounding the upper portion of the circular saw is a guard 53, provided at its inner side with a tubular hub 54, which is clamped to the sleeve 50 by a bolt 55, or the like.

The operation of the machine is as follows:

The work to be cut, may be a plank forming a rafter, such as a jack rafter. In the cutting of the jack rafter, the end may be cut at a compound angle. To accomplish this, the blade 10 is first set at the proper angle with respect to the face 14 of the head 11, to give the proper angle for the transverse cut. The track 21 is then set at the proper angle, to produce the proper angle of the face of the transverse cut. This having been done, the operator holds the handle 16 with the left hand, and the handle 44 with the right hand, and places the blade 10 upon the plank and the face 14 of the head in engagement with the edge of the plank. The operator thus holding the handles, then advances the motor, forwardly of the track 21, and the rotating saw 52 is brought into engagement with the plank, which is cut at the desired compound angle. It is obvious that the device may be employed for cutting the end of the plank at a simple angle, or the table employed to make a square cut.

It is to be understood that the form of my invention herewith shown and described is to be taken as a preferred example of the same, and that various changes in the shape, size, and arrangement of parts, may be resorted to without departing from the spirit of my invention or the scope of the subjoined claims.

Having thus described my invention, I claim:

1. In a portable power operated saw device, a base element, a head extending transversely of the base element, and pivotally connected therewith for angular adjustment with relation thereto, bearing-standards attached to the base element near its ends and projecting above the same, a track having its ends pivoted within the bearing-standard, means to clamp one end of the track to the adjacent bearing-standard, a motor bodily mounted upon the track to move longitudinally thereof and to turn therewith, and a cutting element carried and driven by the motor.

2. In a power operated saw, a base element, a head pivotally connected with the base element and extending transversely thereof for angular adjustment with relation thereto, said head having a segmental scale, a pointer carried by the adjacent end of the base element for co-action with the scale, means to clamp the base element and head together, bearing-standards mounted upon the base element, a track extending longitudinally of the base element and having trunnions pivotally mounted within the bearing-standards, means to clamp one trunnion to the adjacent bearing element, a motor bodily mounted upon the track to travel longitudinally thereof and to turn therewith, and a rotary cutting element carried and driven by the motor.

3. In a portable power operated saw, a base element, a transverse head pivotally connected therewith, means for indicating the relative angular position of the base element with relation to the transverse head, bearing-standards mounted upon the base element, a track extending longitudinally of the base element and having trunnions pivoted within the bearing-standards, means carried by one trunnion to clamp the track against turning movement upon the trunnions, and means for indicating the angular position of the track with respect to the base element including a pointer attached to one trunnion, a motor having a base bodily mounted upon the track to move longitudinally thereof and turnable therewith, and a rotary cutter bodily shiftable with the motor and driven thereby.

4. In a portable power operated saw, a base element, a transverse head pivotally connected therewith and provided with a handle, bearing-standards mounted upon the base element, a track extending longitudinally of the base element and having trunnions pivoted within the bearing-standards, a nut screw-threaded upon one trunnion for clamping the track against turning movement upon its trunnions, one bearing-standard having a scale, a pointer mounted upon the trunnion adjacent to the scale and adapted to turn with such trunnion, a motor bodily mounted upon the track to move longitudinally of the same and to turn therewith, a rotary cutter driven by the motor, and a handle mounted upon the upper end of the motor, the first and second named handles extending generally parallel with relation to each other.

In testimony whereof I affix my signature.

WALTER H. HANNAH.